(12) United States Patent
Geromiller

(10) Patent No.: US 8,397,389 B2
(45) Date of Patent: Mar. 19, 2013

(54) POWER TOOL

(75) Inventor: Ludwig Geromiller, Rudersberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 588 days.

(21) Appl. No.: 12/636,118

(22) Filed: Dec. 11, 2009

(65) Prior Publication Data
US 2010/0146796 A1  Jun. 17, 2010

(30) Foreign Application Priority Data

Dec. 17, 2008 (DE) .................. 10 2008 062 603

(51) Int. Cl.
*B26B 19/02* (2006.01)
(52) U.S. Cl. ............. 30/208; 30/209; 30/210; 30/216; 30/220
(58) Field of Classification Search ............ 30/208–210, 30/216–220, 392–394; 56/233
See application file for complete search history.

(56) References Cited

U.S. PATENT DOCUMENTS

| | | | | | |
|---|---|---|---|---|---|
| 4,619,045 | A | * | 10/1986 | Mayer | 30/216 |
| 5,271,154 | A | * | 12/1993 | Ohkanda | 30/216 |
| 5,373,641 | A | * | 12/1994 | Ohkanda | 30/216 |
| 5,581,891 | A | * | 12/1996 | Wheeler et al. | 30/216 |
| 5,689,887 | A | * | 11/1997 | Heywood et al. | 30/220 |
| 5,771,583 | A | * | 6/1998 | Kremsler et al. | 30/216 |
| 5,987,753 | A | * | 11/1999 | Nagashima | 30/216 |
| 6,263,579 | B1 | * | 7/2001 | Nagashima | 30/220 |
| 6,598,299 | B2 | * | 7/2003 | Stark et al. | 30/220 |
| 6,698,177 | B1 | * | 3/2004 | Akehi et al. | 56/236 |
| 7,406,770 | B2 | * | 8/2008 | Mace et al. | 30/216 |
| 7,757,405 | B2 | * | 7/2010 | Peterson et al. | 30/220 |
| 7,788,811 | B2 | * | 9/2010 | Hanada et al. | 30/216 |
| 8,028,423 | B2 | * | 10/2011 | Matsuo et al. | 30/220 |
| 2005/0115080 | A1 | * | 6/2005 | Sasaki et al. | 30/210 |
| 2008/0134521 | A1 | * | 6/2008 | Hanada et al. | 30/173 |
| 2011/0179651 | A1 | * | 7/2011 | Hittmann et al. | 30/216 |
| 2012/0017558 | A1 | * | 1/2012 | Pellenc | 56/233 |
| 2012/0036722 | A1 | * | 2/2012 | Hittmann et al. | 30/216 |
| 2012/0151778 | A1 | * | 6/2012 | Svennung | 30/216 |
| 2012/0167394 | A1 | * | 7/2012 | Lugert et al. | 30/216 |

FOREIGN PATENT DOCUMENTS

DE  102008062603 A1 * 10/2010
EP     2198691 A2 * 6/2010

* cited by examiner

*Primary Examiner* — Jason Daniel Prone
(74) *Attorney, Agent, or Firm* — Gudrun E. Huckett

(57) ABSTRACT

A power tool has a drive motor and first and second tool members driven reciprocatingly by the drive motor in opposite directions, respectively. The first tool member is driven by a first connecting rod and the first connecting rod is connected to the first tool member by a first pivot joint arranged on the first connecting rod. The second tool member is driven by a second connecting rod and the second connecting rod is connected to the second tool member by a second pivot joint arranged on the second connecting rod. The first pivot joint is arranged on an end of the first connecting rod which end is facing the tool members. The second pivot joint is arranged on an end of the second connecting rod which end is facing away from the tool members.

13 Claims, 4 Drawing Sheets

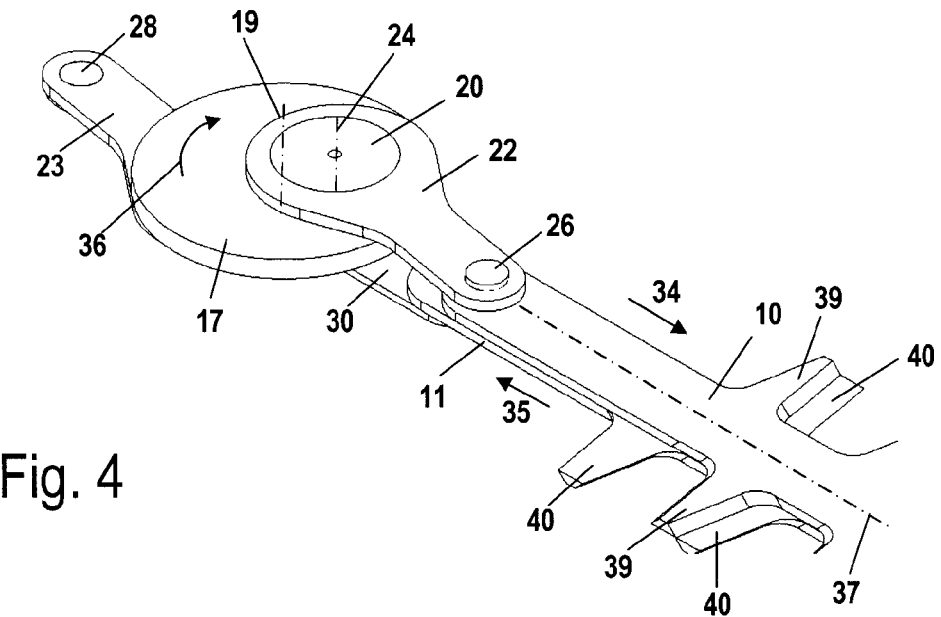
Fig. 4
Fig. 5
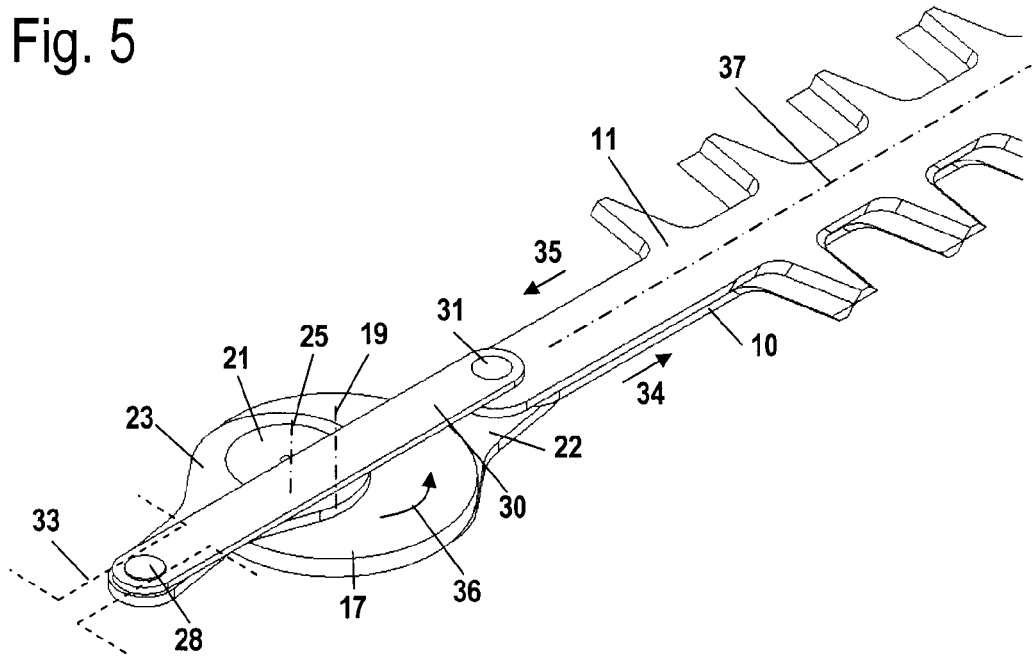

PRIOR ART

POWER TOOL

BACKGROUND OF THE INVENTION

The invention relates to a power tool, in particular a hand-held power tool such as a hedge trimmer or the like, comprising at least two tool members that are driven in a reciprocating fashion by a drive motor in opposite directions, respectively. Each tool member is driven by a connecting rod that is connected to the correlated tool member by means of a pivot joint arranged on the connecting rod. The pivot joint is arranged on the first connecting rod on the end of the first connecting rod that is facing the tool members.

U.S. Pat. No. 5,771,583 discloses a power tool with a hedge trimmer attachment that has two oppositely driven shearing blades. The shearing blades are connected by connecting rods to an eccentric member. Both connecting rods extend in the direction toward the shearing blade supports, i.e., in the same direction.

In power tools, in particular hand-held power tools, such as hedge trimmers or the like, the vibrations that occur in operation put great stress on the operator. The forces that are generated by the vibrations also cause stress in the components of the power tool so that these components must be configured to be correspondingly solid and thus also heavy. The vibrations reduce the service life of the power tool.

SUMMARY OF THE INVENTION

It is an object of the present invention to provide a power tool of the aforementioned kind in which the vibrations that result in operation are reduced.

In accordance with the present invention, this is achieved in that the pivot joint on a second connecting rod is arranged on an end of the second connecting rod that is facing away from the tool members.

It has been found that in power tools with two oppositely and reciprocatingly driven tool members, as in hedge trimmers, the vibrations that occur in operation are generated predominantly in the transmission and by the oscillating masses of the cutter bars. In particular, at higher engine speeds the transmission vibrations dominate the vibrations generated by the drive motor.

In order to reduce the transmission forces of first and second order and thus also the resulting vibrations, it is now proposed to orient the two connecting rods in opposite directions relative to one another. The pivot joint of the first connecting rod is thus arranged on the end of the first connecting rod that is facing the tool members and the pivot joint of the second connecting rod is positioned on the opposite end of the second connecting rod that is facing away from the tool members. As a result of the opposite orientation of the two connecting rods the forces which are introduced in operation by the oscillating tool member masses, in particular the mass forces of the second order, are substantially and in particular completely compensated or canceled. In this way, the vibrations that occur in operation in particular at high engine speed can be significantly reduced. The arrangement of the pivot joint at the second connecting rod on the end of the second connecting rod that is facing away from the tool members can be realized in a constructively simple way. The required mounting space is only minimally enlarged. Thus, in a simple way the vibrations occurring in operation can be reduced and the service life of the power tool can be increased.

A simple configuration results when the connecting rods each are arranged on an eccentric cam wherein the eccentric cams are rotatingly driven about a common axis of rotation. In this connection, the two eccentric cams are advantageously arranged on a drive disk that in particular is rotatingly driven by a pinion about the axis of rotation. The drive disk together with the two eccentric cams can be configured as a monolithic part so that only one component is required for driving of the connecting rods. The two eccentric cams are advantageously arranged on opposite faces of the drive disk. In this way, each connecting rod is resting on the drive disk. This reduces the relative movements during operation and thus the resulting forces. However, it can also be advantageous to arrange both connecting rods on one face or side of the drive disk so that the connecting rods rest on one another.

In order to connect the second connecting rod to the second tool member, a linkage rod is arranged advantageously on the pivot joint of the second connecting rod. This linkage rod bridges the distance between the second pivot joint and the connecting point that is provided for connecting the connecting rod to the tool member in case the connecting rod is oriented toward the tool member. In this way, the tool members that are employed in conventional power tools can be utilized here. However, it can also be provided that the second tool member is extended to the second pivot joint and the second pivot joint is directly connected to the second tool member.

Advantageously, the linkage rod at the second pivot joint is guided in a direction parallel to the movement direction of the second tool member, in particular along an extension of the longitudinal center axis of the second tool member. Because the first pivot joint and the second pivot joint are guided in the same plane, which advantageously also contains the axis of rotation of the drive disk, and because the two connecting rods at any point in time are arranged parallel to one another, the forces of second order that are generated in operation in the transmission cancel one another completely. The linkage rod produces additional excitation forces of the first order. Advantageously, on the first tool member an additional mass is arranged that compensates the mass forces that are caused by the linkage rod at least partially and in particular completely. In this way, the mass forces of first and second order can be compensated completely. In this way, a significant reduction of the vibrations occurring in operation is achieved. The additional mass can be attached to the first tool member or can be monolithically and integrally formed with the first tool member.

Advantageously, the tool members are guided by guide means in the movement direction. A lateral deviation of the tool members can thus be prevented in a simple way. The tool members project advantageously in the same direction and are arranged approximately on top one another. The two tool members can be arranged to be immediately stacked on one another or with intermediate positioning of additional elements. The tool members are in particular cutter bars and the power tool is advantageously a hand-held hedge trimmer.

BRIEF DESCRIPTION OF THE DRAWING

FIG. 4 is a perspective illustration of the transmission of the hedge trimmer in a first position in plan view onto the first cutter bar.

FIG. 5 is a perspective illustration of the transmission of the hedge trimmer in the position of FIG. 4 in plan view onto the second cutter bar.

DESCRIPTION OF THE PREFERRED EMBODIMENTS

Figure 1:
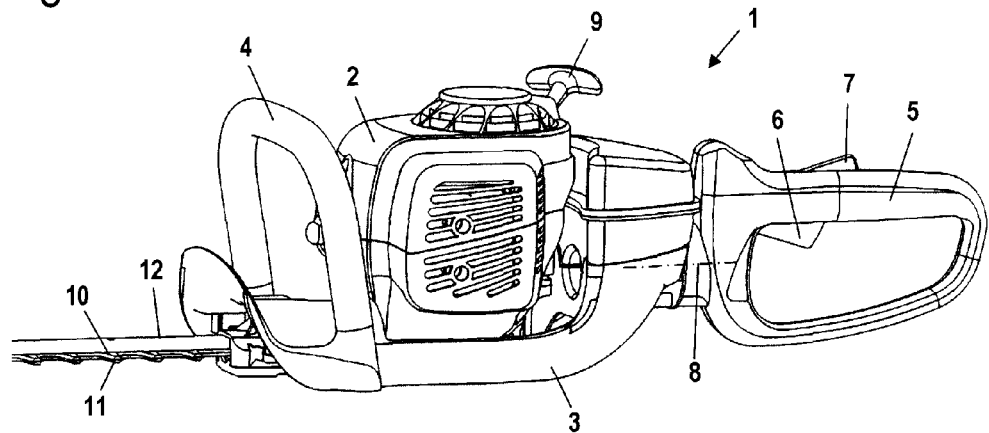
FIG. 1 is a perspective side view of a hedge trimmer.

The embodiment of the power tool illustrated in FIG. 1 is a hand-held hedge trimmer 1. The power tool can also be, for example, a harvesting machine or another type of cutting device. For example, the power tool can be a combine harvester or a saw with oppositely driven cutting blades. The power tool can also be a special type of harvester such an olive shaker/harvester or the like. The hedge trimmer 1 has a housing 2 in which a drive motor, not shown in FIG. 1, is arranged. The drive motor is embodied as an internal combustion engine and is to be started by means of a starter handle 9 projecting from the housing 2. The housing 2 is supported by means of vibration damping elements on a grip frame 3. The grip frame 3 has a front handle 4 embodied as a bow-shaped handle as well as a rear handle 5. On the rear handle 5 a throttle lever 6 and a throttle lock 7 are pivotably supported. The rear handle 5 is supported so as to swivel about an axis of rotation 8 on the frame 3 so that the rear handle 5 can be adjusted in different gripping positions. As tool members the hedge trimmer 1 has two cutter bars 10, 11 that are projecting at the end of the frame 3 opposite the rear handle 5 forwardly out of the grip frame 3. The two cutter bars 10, 11 are arranged on top one another. The upper cutter bar 10 is covered by a guide bar 12 across a portion of its length. The guide bar 12 guides the cutter bars 10 and 11 laterally and vertically and ensures a satisfactory stiffness of the cutting tool.

Figure 2:
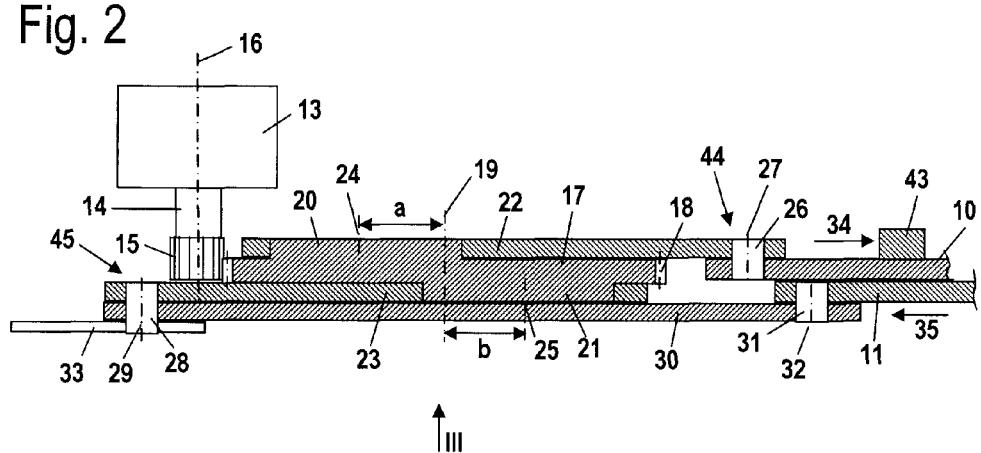
FIG. 2 is a schematic section illustration of the transmission of the hedge trimmer according to FIG. 1.

FIG. 2 shows the transmission of the hedge trimmer 1 in a schematic illustration. The drive motor 13 arranged in the housing 2 drives by a drive shaft 14 a pinion 15. The pinion 15 drives a drive disk 17 that is rotatably supported on axis of rotation 19. The drive disk 17 can be, for example, supported by means of a bearing bolt in a transmission housing of the hedge trimmer 1. The drive shaft 14 and the pinion 15 are driven in rotation about axis of rotation 16 that has a spacing relative to the axis of rotation 19. The pinion 15 engages a toothing or gear 18 embodied on the outer circumference of the drive disk 17. The top face of the drive disk 17 that is facing the drive motor 13 has a first eccentric cam 20 on which a first connecting rod 22 is pivotably supported. The pivot axis 24 of the connecting rod 22 that corresponds to the center axis of the first eccentric cam 20 has a spacing a relative to the axis of rotation 19. On the opposite bottom face of the drive disk 17 that is facing away from the drive motor 13 a second eccentric cam 21 is arranged on which the second connecting rod 23 is supported so as to be pivotable about a pivot axis 25. The pivot axis 25 corresponds to the center axis of the second eccentric cam 21 and has a spacing b relative to the axis of rotation 19 of the drive disk 17. The spacings a and b are of the same magnitude. The two pivot axes 24 and 25 and thus also the eccentric cams 20, 21 are positioned opposite one another relative to the axis of rotation 19. The axis of rotation 19 and the two pivot axes 24 and 25 are positioned in a common plane that corresponds to the section plane in FIG. 2. It may also be provided that the two eccentric cams 20, 21 are arranged on the same face of the drive disk 17.

The first connecting rod 22 projects in the direction toward the two cutter bars 10 and 11. On its end facing the cutter bar 10 the first connecting rod 22 is connected by a first pivot joint 44 to the cutter bar 10. The first pivot joint 44 is formed by a connecting bolt 26. On the first pivot joint 44 the connecting rod 22 is pivotable about pivot axis 27 relative to the cutter bar 10; this pivot axis 27 corresponds to the longitudinal center axis of the connecting bolt 26.

The second connecting rod 23 projects in a direction facing away from the cutter bar 11 so that the two connecting rods 22 and 23 are oriented in opposite directions relative to one another. The second connecting rod 23 is connected by a second pivot joint 45 to a linkage rod 30. The second pivot joint 45 is arranged on the end of the second connecting rod 23 that is facing away from the cutter bars 10, 11. By means of the two connecting rods 22, 23 the two cutter bars 10, 11 are driven reciprocatingly and in opposite directions relative to one another.

In the position illustrated in FIG. 2, in which the two pivot axes 24 and 25 are positioned in a common plane in which also the longitudinal center axis 37 of the cutter bars 10, 11 (FIG. 3) is positioned, the two pivot joins 44 and 45 are also arranged in said plane. The two pivot joints 44, 45 are arranged on opposite sides of the axis of rotation 19. The second pivot joint 45 is formed by a connecting bolt 28. On the second pivot joint 45 the second connecting rod 23 is pivotably supported relative to the linkage rod 30 about a pivot axis 29. The linkage rod 30 connects the second pivot joint 45 to the second cutter bar 11. One end of the linkage rod 30 is connected by means of connecting bolt 28 to the second connecting rod 23 and the opposite second end is connected by means of a connecting bolt 31 to the second cutter bar 11. The connecting bolt 31 has a longitudinal center axis 32.

The linkage rod 30 and the second cutter bar 11 are connected advantageously fixedly to one another by the connecting bolt 31 so that no pivot movement of the linkage rod 30 relative to the cutter bar 11 is possible about longitudinal center axis 32. When a pivot movement of the linkage rod 30 is possible about the connecting bolt 31 relative to the second cutter bar 11, a guide 33 is advantageously provided on the connecting bolt 28. The guide 33 guides the connecting bolt 28 or the linkage rod 30 in the direction of the longitudinal center axis 37 of the cutter bars 10, 11. In this way, a lateral deflection of the second pivot joint 45 is prevented.

For compensation of the mass forces caused by the linkage rod 30, an additional mass 43 is arranged on the cutter bar 10. The additional mass 43 can be a separate mass body secured on the cutter bar 10 or can be monolithically and unitarily formed on or integrated in the cutter bar 10.

In FIG. 2 the first eccentric cam 20 is illustrated in its position remote from the cutter bars 10, 11 and the second eccentric cam 21 is in the position proximal to the cutter bars 10, 11. From this position, the first cutter bar 10 is moved in the direction of arrow 34 away from the drive disk 17 upon further rotation of the drive disk 17 while the second cutter bar 11 is moved in the direction of arrow 35 toward the drive disk 17.

Figure 3:
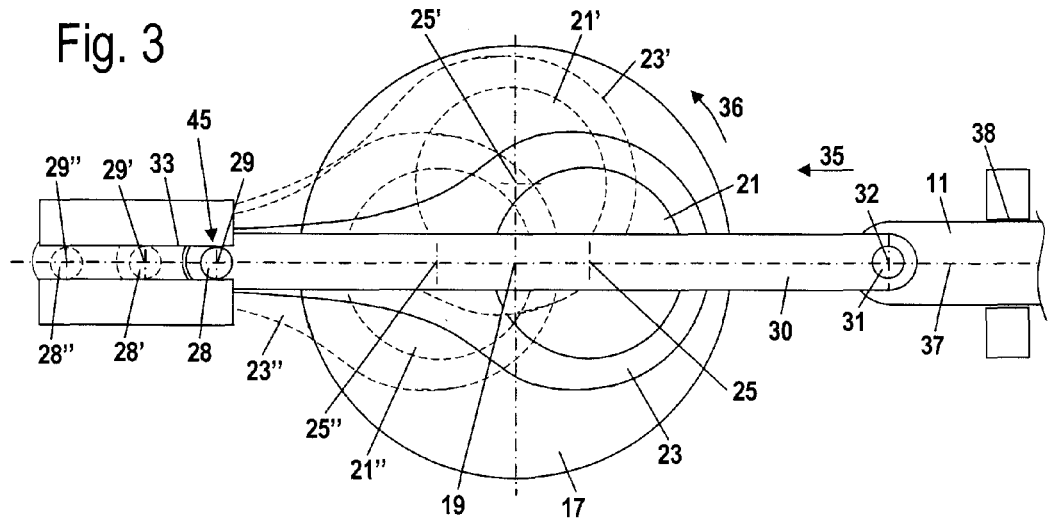
FIG. 3 is schematic side view in the direction of arrow III in FIG. 2.

FIG. 3 shows the position of the connecting rod 23 for further rotation of the drive disk 17 in direction of arrow 36. In the position of the connecting rod 23 that is shown in solid lines in FIG. 3 and that corresponds to the position of the connecting rod 23 in FIG. 2, the pivot axis 25 of the connecting rod 23 on the eccentric cam 21 is positioned on the side of the axis of rotation 19 facing away from the pivot joint 45. The longitudinal center axis 32 of the connecting bolt 31 has a maximum spacing relative to the longitudinal center axis 19.

Upon rotation of the drive disk 17 about 90° in the direction of arrow 36 about the axis of rotation 19, the connecting rod 23 with the eccentric cam 21 is moved into the position of connecting rod 23' with eccentric cam 21' indicated in dashed lines in FIG. 3. The pivot axis 25' is arranged in this position relative to the longitudinal axis 37 at the level of the axis of rotation 19, the connecting bolt 28' (shown in dashed lines) with pivot axis 29' has been moved in the guide 33 to the left. The pivot joint 25 has been moved in the direction of longitudinal center axis 37 away from the axis of rotation 19 so that the cutter bar 11 has been moved into a position, not illustrated in FIG. 3, toward the axis of rotation 19.

Upon further rotation of the drive disk 17, the connecting rod 23" with eccentric cam 21" reaches a position in which the pivot axis 25" is arranged on the side of the axis of rotation 19 that is facing away from the cutter bar 11 and faces the connecting bolt 28". In this position the connecting bolt 28" with pivot axis 29" is even father removed from the axis of rotation 19. Accordingly, the spacing of the connecting bolt 31 to the axis of rotation 19 is smaller.

As shown in FIG. 3, the pivot axis 29, the axis of rotation 19 and the longitudinal center axis 32 of the connecting bolt 31 in any position of the connecting rod 23 are in a common plane that also contains the longitudinal center axis 37 of the cutter bar 11. This is ensured by the guide 33. Instead of the guide 33, a fixed connection of the linkage rod 30 with the cutter bar 11 may be provided also that prevents a pivot movement of the linkage rod 30. As shown in FIG. 3, the cutter bar 11 is guided on a guide 38 in the direction of its longitudinal center axis 37. The cutter bar 10 is guided likewise by guide means. The guide 38 can also be embodied as a bolt that is guided in a longitudinal groove in the cutter bar 11. Advantageously, a guide 38 for both cutter bars 10, 11 is provided. However, it is also possible that each cutter bar 10, 11 has a separate guide 38 as guide means.

In FIGS. 4 and 5 the location of the first connecting rod 22 and of the second connecting rod 23 in a further position of the transmission of the hedge trimmer 1 is illustrated. The connecting rod 22 moves upon further rotation of the drive disk 17 in the direction of arrow 36 about the axis of rotation 19 farther toward the cutter bar 10 so that the cutter bar 10 is moved away from the axis of rotation 19 in the direction of arrow 34. The second connecting rod 23 moves away from the cutter bars 10, 11 so that the second cutter bar 11 in the direction of arrow 35 is pulled toward the drive disk 17. As shown in FIG. 4, the first cutter bar 10 comprises several knives 39 that project laterally outwardly and each have two cutting edges, respectively. The second cutter bar 11 has laterally outwardly projecting knives 40 that are also each provided with two cutting edges. In the position of the cutter bars 10 and 11 illustrated in FIGS. 4 and 5 the knives 39 and 40 partially overlap. It is also possible that only one cutting edge is formed on the knives 39, 40, respectively.

Figure 6:
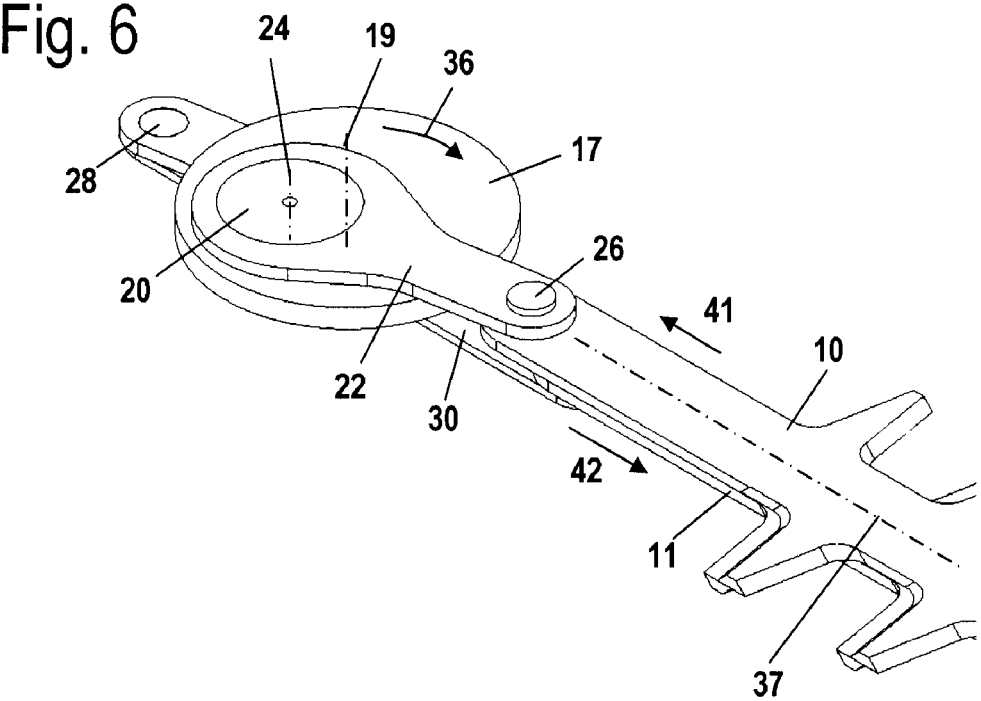
FIG. 6 is a perspective illustration of the transmission in a second position in plan view onto the first cutter bar.
Figure 7:
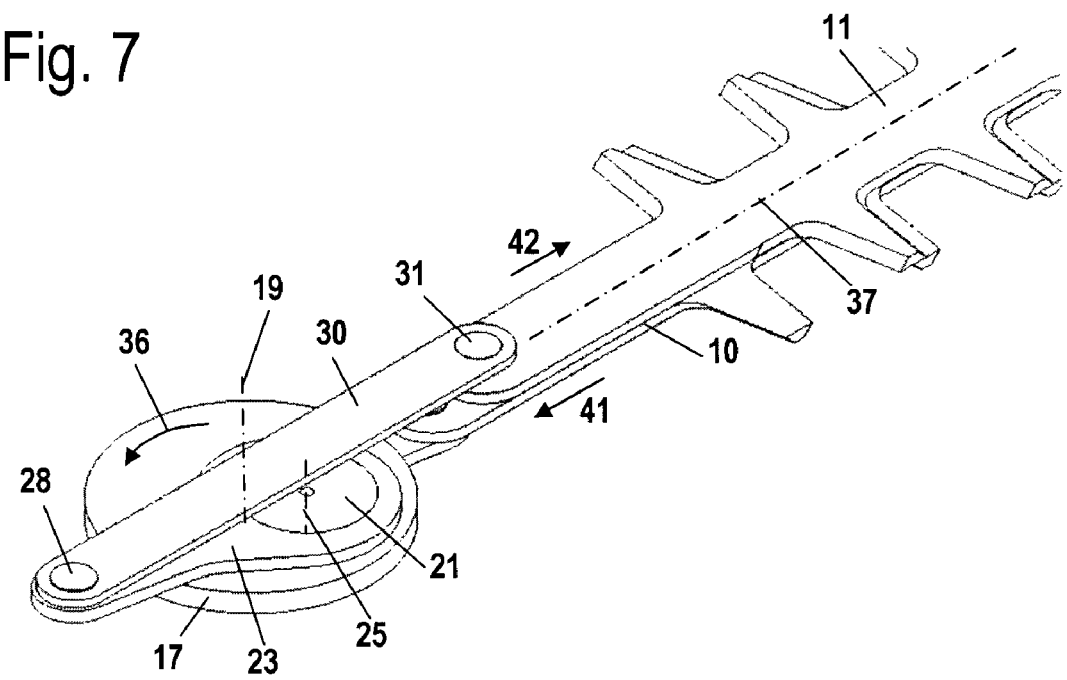
FIG. 7 is a perspective illustration of the transmission in the position of FIG. 6 in plan view onto the second cutter bar.

In FIGS. 6 and 7 the transmission of the hedge trimmer 1 is shown in a further position. The pivot axis 24 of the first connecting rod 22 is arranged on the side of the cutter bar 10 that is facing away from the axis of rotation 19. Upon further rotation of the drive disk 17 in the direction of arrow 36 the pivot axis 24 is moved farther onto the side of the axis of rotation 19 facing away from the cutter bars 10 and 11. In this way, the first cutter bar 10 is pulled in direction of arrow 41 toward the axis of rotation 19. The pivot axis 25 of the second connecting rod 23 is arranged on the side of the axis of rotation 19 facing the cutter bars 10 and 11 and moves upon further rotation of the drive disk 17 in the direction of arrow 36 farther toward the cutter bars 10, 11. In this way, the second cutter bar 11 is moved in the direction of arrow 42 away from the axis of rotation 19.

Because of the opposed arrangement of the two eccentric cams 20, 21 the forces that are introduced by the connecting rods 22, 23 laterally into the transmission, i.e., in the direction transversely to the longitudinal center axis 37, are completely compensated. The connecting rods 22, 23 are identically embodied as are the eccentric cams 20, 21. The forces of second order on the transmission that are produced in the direction of the longitudinal center axis 37 are compensated in that the two connecting rods 22, 23 are oriented opposite to one another. The additional forces that are introduced by the linkage rod 30 can be compensated by the additional mass 43 on the first cutter bar 10 shown in FIG. 2. In this way, the forces that are introduced in operation at the transmission and thus the vibrations of the hedge trimmer 1 caused by the transmission can therefore be significantly reduced.

Figure 8:
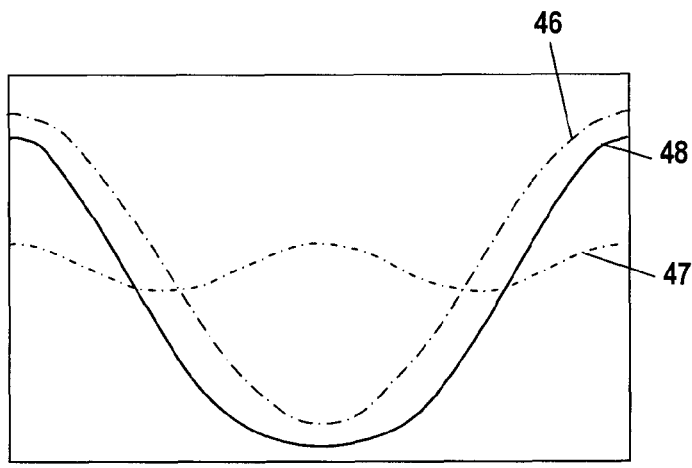
FIG. 8 is a diagram that shows the course of the mass forces on the first cutter bar.
Figure 9:
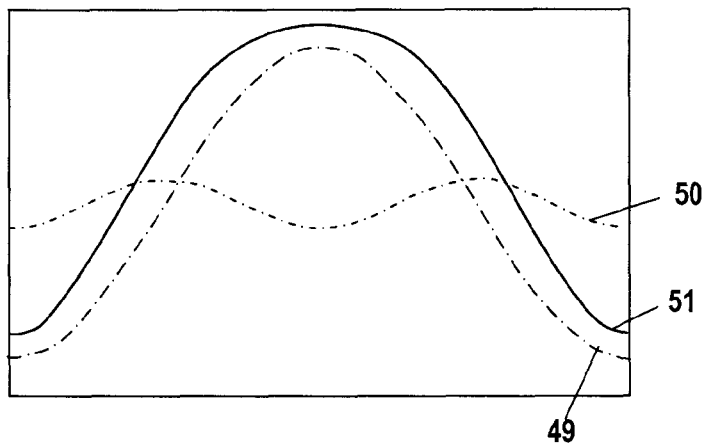
FIG. 9 is a diagram that shows the course of the mass forces on the second cutter bar.

The FIGS. 8 and 9 show the course of the mass forces on the cutter bars 10 and 11. FIG. 8 shows the course of the mass forces on the first cutter bar 10 for one revolution of the drive disk 17. The curve 46 shows the course of the mass forces of first order and the curve 47 the course of the mass forces of second order. The resulting force is illustrated by curve 48. In approximation and based on the assumption that the mass of the connecting rod 22 is significantly smaller than the mass of the cutter bar 10, the resulting force can be calculated as follows:

$$F = m \cdot r \cdot \omega^2 \cdot (\cos \omega t + \lambda \cdot \cos 2\omega t).$$

F is the oscillating mass force, m is the oscillating mass, r is the crank radius, λ is the crank ratio that represents the ratio of crank radius to connecting rod length, and ω is the angular speed.

FIG. 9 shows the oscillating mass forces for the second cutter bar 11. The curve 49 shows the oscillating mass forces of first order and the curve 50 shows the oscillating mass forces of second order. The curve 51 indicates the resulting force of mass forces of first and second order. As shown in FIGS. 8 and 9, the oscillating mass forces of first and second order are directed precisely opposite to one an other for the two cutter bars 10 and 11 so that the forces cancel one another.

Figure 10:
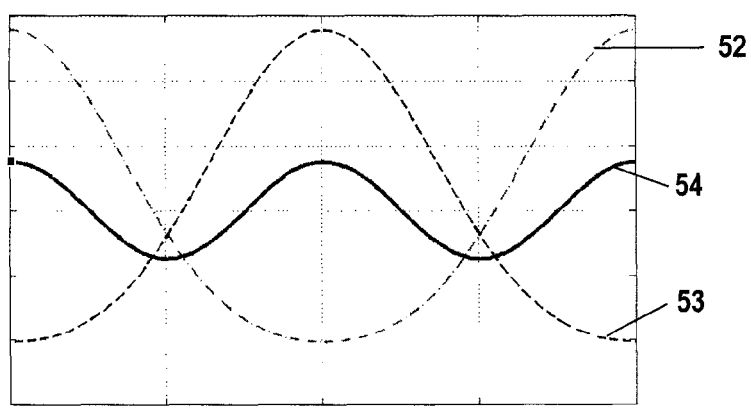
FIG. 10 is a diagram that shows the course of the mass forces for a cutter bar arrangement according to the prior art.

FIG. 10 shows the course of the mass forces in a prior art connecting rod arrangement in which the two connecting rods project in the direction toward the shearing blade supports. The curve 52 indicates the resulting mass forces of first and second order for a first blade support and the curve 53 the resulting mass forces for the second blade support. The mass forces of first and second order do not compensate one another in the prior art connecting rod arrangement. A resultant force indicated by curve 54 is generated.

The proposed arrangement of the present invention for connecting rods can also be advantageous in connection with other oppositely and reciprocatingly driven tool members.

The specification incorporates by reference the entire disclosure of German priority document 10 2008 062 603.1 having a filing date of Dec. 17, 2008.

While specific embodiments of the invention have been shown and described in detail to illustrate the inventive principles, it will be understood that the invention may be embodied otherwise without departing from such principles.

What is claimed is:

1. A power tool comprising:
   a drive motor;
   a first and a second tool members driven reciprocatingly by said drive motor in opposite directions, respectively;

wherein said first tool member is driven by a first connecting rod, wherein said first connecting rod is connected by a first connection to said first tool member, wherein said first connection comprises a first pivot joint arranged on said first connecting rod;

wherein said second tool member is driven by a second connecting rod, wherein said second connecting rod is connected by a second connection to said second tool member, wherein said second connection comprises a second pivot joint arranged on said second connecting rod;

wherein said first pivot joint is arranged on an end of said first connecting rod, wherein said end of said first connecting rod faces said first and second tool members;

wherein said second pivot joint is arranged on an end of said second connecting rod, wherein said end of said second connecting rod faces away from said first and second tool members so that said first and second connecting rods are oriented in opposite directions relative to each other.

2. The power tool according to claim 1, further comprising a drive disk driven by said drive motor, wherein said first and second connecting rods each are arranged on an eccentric cam, respectively, and wherein said eccentric cams are arranged on said drive disk that is driven in rotation about an axis of rotation.

3. The power tool according to claim 2, wherein said eccentric cams are arranged on opposed faces of said drive disk.

4. The power tool according to claim 2, wherein said eccentric cams are positioned opposite one another on said drive disk relative to said axis of rotation.

5. The power tool according to claim 1, wherein said second connection further comprises a linkage rod with a first end and a second end, wherein said first end of said linkage rod is connected to said second pivot joint and said second end is connected to said second tool member.

6. The power tool according to claim 5, wherein said first end of said linkage rod is guided in a guide provided on said second pivot joint in a direction parallel to a movement direction of said second tool m ember.

7. The power tool according to claim 6, wherein said linkage rod is guided by said guide in a direction of an extension of a longitudinal center axis of said second tool member.

8. The power tool according to claim 5, further comprising an additional mass arranged on said first tool member, wherein said additional mass compensates, at least partially, mass forces produced by said linkage rod.

9. The power tool according to claim 1, wherein said first and second tool members are guided by a guide in a movement direction of said first and second tool members.

10. The power tool according to claim 1, wherein said first and second tool members project in a same direction and are positioned approximately on top one another.

11. The power tool according to claim 1, wherein said first and second tool members are cutter bars.

12. The power tool according to claim 1 embodied as a hedge trimmer.

13. The power tool according to claim 1, wherein said first connecting rod is secured with said first pivot joint directly on said first tool member.

* * * * *